Feb. 2, 1954  S. R. GREEN  2,668,044
WEIGHING BALANCE
Filed Jan. 30, 1951  3 Sheets-Sheet 2

Inventor
S. R. Green

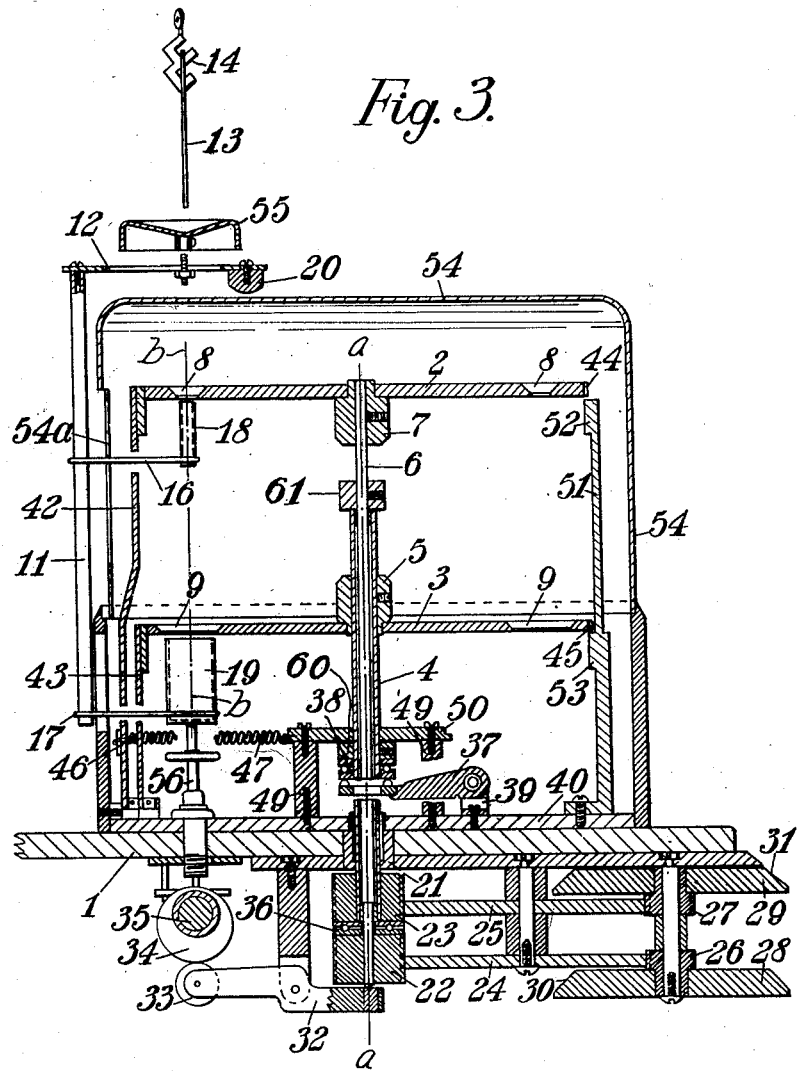

Patented Feb. 2, 1954

2,668,044

UNITED STATES PATENT OFFICE 2,668,044

WEIGHING BALANCE

Sydney Rayner Green, London, England

Application January 30, 1951, Serial No. 208,495

Claims priority, application Great Britain
February 10, 1950

10 Claims. (Cl. 265—54)

This invention relates to weighing balances and particularly to fine weighing balances such as are used for laboratory purposes.

In such balances the finer divisions of weight are taken care of by the use of riders which are suspended from the beam or other suitable part or removed therefrom as desired and also by the scale over which the index arm moves, while weights of unit or multiple unit value are placed on the scale pan.

In fine weighing it is important that the weights are handled as little as possible as such handling causes inaccuracy in the value of the weights, and an object of the present invention is to provide an improved method and means whereby weights of unit or multiple unit value may be mechanically selected and applied to the scale pan without the necessity of handling such weights. A further object is to provide a weight selecting means whereby the desired variation of weight values may be obtained over a desired range by the use of a minimum number of weights.

The invention consists in weight selecting and placing mechanism wherein a series of weights of unit and multiple unit value are arranged in ascending order on carrier means which are adapted to be displaced so that any of the weights may be moved to a position for engagement by suspending or supporting means on the balance whereby such weight or weights may be removed from the carrier means by said displacement and supported by said suspending or supporting means.

The carrier means may comprise a turntable displaceable by rotary movement to position the weights and vertically displaceable to transfer a weight to the suspending or supporting means.

Preferably a pair of carriers or turntables is provided in superposed relation, one carrier or turntable having weights of 1 to 9 units, the other carrier or turntable having weights of 10 to 90 units, the arrangement being such that weights may be selected from either or simultaneously from both carriers or turntables to the desired value.

According to the preferred arrangement the weights on the turntables are located over apertures arranged concentrically around the axis of rotation and the balance is provided with a weight hanger assembly or device having a part (or parts) adapted to lie beneath a weight (or weights) whereby on relative vertical movement of the turntable, with respect to the hanger assembly the weight (or weights) is transferred from the turntable and supported on the hanger assembly.

The hanger assembly is mounted on the balance in place of the weight pan and preferably comprises a bar counterpoised to hang vertically and having horizontally extending arms each supporting a stool for receiving a weight.

In the accompanying drawings:

Figure 1 diagrammatically illustrates a weighing balance having a weight hanger assembly according to the invention.

Figure 3 is a sectional elevation of the weight selecting and placing means, and Figure 4 is a view of a preferred form of weight.

Figure 1:
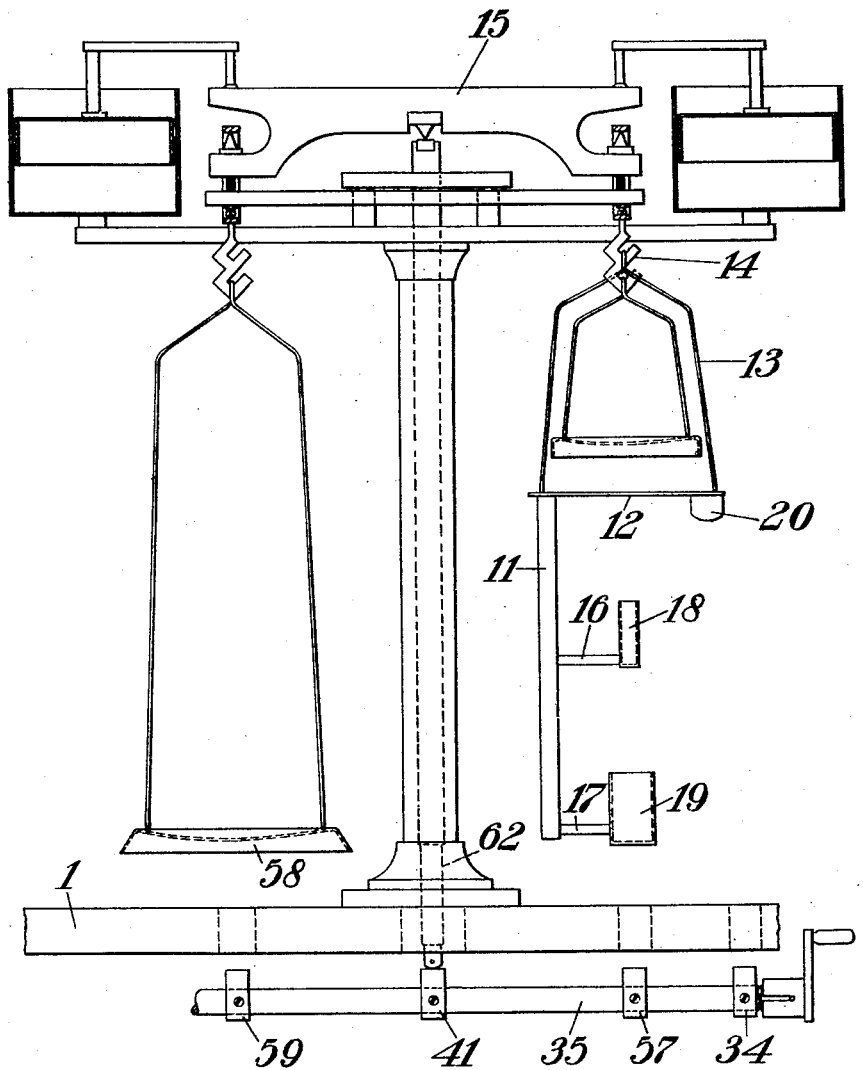
Figure 2:
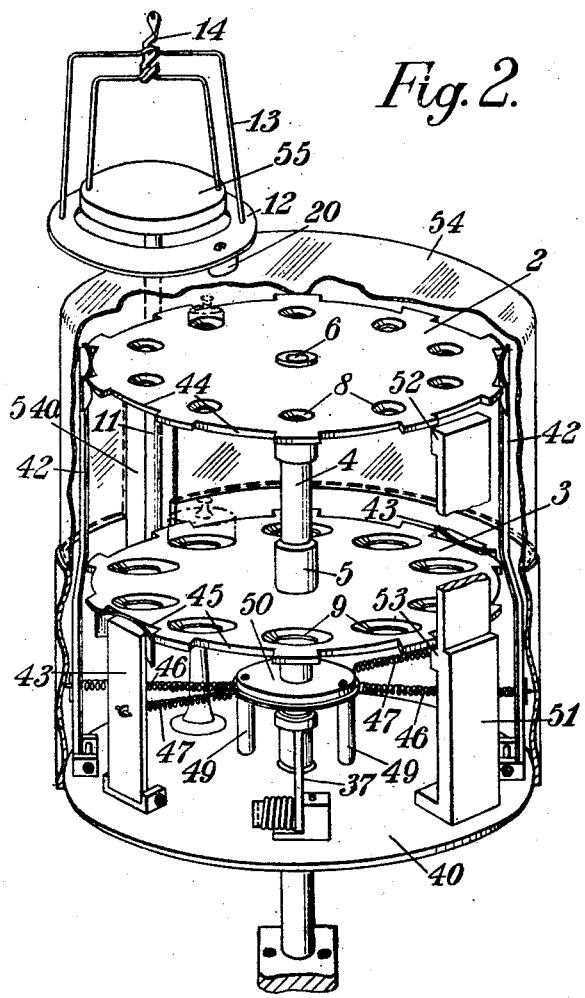
Figure 2 is a perspective view of the weight selecting and placing means according to the invention.
Figure 2:
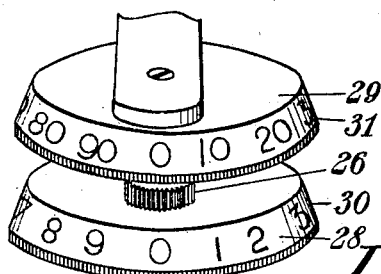

In carrying the invention into effect according to one mode, a weight carrier is mounted on the base 1 of the balance in a position adjacent the axis of the normal weight scale pan.

The weight carrier comprises superposed turntables 2, 3 adapted for independent rotation about a vertical axis. The lower turntable 3 is carried by a sleeve 4 to which it is secured by the collar 5. The sleeve 4 surrounds a spindle 6 on which the upper turntable 2 is carried and to which it is secured by boss 7.

Each turntable 2, 3 is of circular shape and is provided with a circular series of apertures 8 and 9 which are equally angularly spaced, the centres of the apertures of both sets being located at the same radial distance from the vertical axis a—a of the spindle 6 and sleeve 4.

There are ten apertures in each turntable, and in nine apertures in each turntable weights are adapted freely to sit. Thus in the upper turntable 2 there are weights say of 1 to 9 grammes with a vacant or zero-aperture, while in the lower turntable 3 there are weights of say 10 to 90 grammes with a vacant or zero-aperture. Each set of weights may be of cylindrical shape, the upper set being of a small diameter while those of the lower set are of a larger diameter, the apertures being of corresponding different sizes.

The apertures 8 and 9 may be coned or partly coned and the base of the weights similarly or suitably shaped on their base 10 to afford a centralising effect, see Figure 4.

The normal weight scale pan is replaced by a hanger comprising a bar 11 suspended from a yoke piece or ring 12 removably supported by a bail 13 from a hook 14 on the balance beam 15. The bar 11 is adapted to lie vertically adjacent but spaced from the edges of the turntables 2, 3. The bar 11 has a pair of horizontal arms 16, 17 projecting beneath the turntables respectively. The arms 16, 17 carry stools or platforms 18, 19 respectively which may conveniently comprise tubular members the axes of which are vertical.

The stools or platforms 18 and 19 are mounted with their axes in alignment with one another and also with the axis of the hanger assembly. Thus the hanger assembly and the stools or platforms have a common vertical axis $b$—$b$ that coincides with the pitch circles of the centers of the weight apertures 8 and 9. As shown in Figure 3 the radius of the pitch circle equals the distance between the axes $a$—$a$ and $b$—$b$.

The ring 12 is provided with a counterweight 20 to balance the bar 11 and stools 18, 19 so that the arm and stool axes will hang vertical.

The turntables 2 and 3 are adapted to be rotated or turned to the appropriate positions and subsequently lowered so that a weight or weights corresponding to such positions become seated on the corresponding stool or stools and is thus borne by the beam 15. It will be appreciated that the weights are thus firmy seated on the stools in a manner which prevents a relative movement (such as a swinging movement) of the hanger assembly.

For the purpose of rotating the turntables 2 and 3, the spindle 6 and sleeve 5 thereof extend through a bearing 21 and below the base 1 and are provided with pinions 22, 23 meshing with idler gear wheels 24, 25 which in turn mesh with pinions 26, 27 carried by superposed rotary dial members 28, 29 which are provided with value numbers on the faces 30, 31 conforming in position to the corresponding weight apertures in the respective turntable and also zero indications which correspond to the apertures in the turntables which are not provided with weights.

The lower end of the spindle 6 seats upon a rocker arm or pivoted lever 32, the other end of which has a roller 33 engaging a rotary cam 34 on a cam shaft 35 which extends to one side of the base and preferably both sides of the base.

Between the pinions 22, 23 on the spindle and sleeve a thrust bearing 36 is provided which also takes the weight of the lower turntable 3.

The weight of both tables 2 and 3 is also counterbalanced by a spring biassed lever or arm 37 operating through a thrust bearing 38, such lever being pivoted upon a bearing member 39 secured to the base plate 40.

The thrust bearing 38 abuts a collar 60 secured to the sleeve 4. As its upper end the sleeve 4 abuts a collar 61 secured to the spindle 6 so that the thrust of the lever 37 is transmitted to both turntables 2 and 3 and thus there will be no relative axial movement between the spindle 6 and sleeve 5.

The cam shaft 35 is also preferably utilised for raising and lowering the balance beam 15 for which purpose it is provided with a second appropriately located cam 41 engaging the beam post 62. The angular disposition of the cams 34 and 41 on this shaft is such that the turntable is lowered and the weight (or weights) supported by the stool (or stools) prior to the beam being free.

Obviously independent controls for raising and lowering the turntables and beam may be provided.

The turntables 2 and 3 are provided with indexing or positioning means comprising pivotally mounted tongues 42 and 43 adapted to engage in recesses 44, 45 in the edges of the turntables. The tongues are spring biassed by springs 46, 47 connected to a bearing plate 50, which is mounted upon post 49 from the plate 40. The tongues 42, 43 are preferably arranged in oppositely disposed pairs and at their upper ends are provided with curved strips for engaging the recesses 44, 45.

Means are also provided for locking the turntables 2, 3 in position against rotation during a weighing operation whether or not a weight (or weights) from the turntable (or turntables) is being used. For such purpose a rigid post 51 is mounted on the plate 40 and is provided with a pair of projections 52, 53 adapted for engagement in the recesses 44, 45 when the turntables are lowered. This locking of the turntables against rotation during a weighing operation ensures that any weights removed from the turntables are returned to the correct position on the turntable being raised at the end of the weighing operation.

The turntables 2 and 3 are covered by a removable transparent cover 54 to avoid corrosion of the weights by the materials being weighed, such cover having a side opening 54a through which the supporting arms 16, 17 for the stools project.

In operation assuming that it is required to place on the weight hanger assembly weights equivalent to 42 grammes, the upper turntable 2 is rotated so that the 2 gramme weight is moved over the upper stool 18, and the lower turntable 3 is rotated so that the 40 gramme weight is located over the lower stool 19. On actuation of the cam shaft 35 the turntables are lowered so that the selected weights are freed therefrom and supported upon their respective stools. At the same time the turntables 2 and 3 are locked in position by the projections 52, 53 engaging the appropriate recesses 44, 45 so that when the weighing operation is completed and the beam 15 lowered the selected weights will be returned to their respective positions in the turntables.

When the weighing operation requires no additional weights from the turntables 2, 3 the latter will be located in their zero positions so that the uncovered holes are in alignment with the stools 18, 19. Under this condition the turntables will be lowered and the stools will pass through the zero aperture and the turntable locked against rotation during the raising of the beam and the weighing operation.

It will be appreciated that with the proposed allocation of weights any desired weight may be added between 1 and 99 grammes. Should an additional weight of 100 grammes within the capacity of the balance be required, such will be placed by the operation on the scale pan 55 associated with the weight hanger assembly and supported upon the hook 14.

Obviously a further turntable or turntables may be added depending upon the space available or in some cases a single turntable may be provided.

I claim:

1. A weight selecting and placing mechanism for fine weighing balances having a weight platform suspended from the balance beam, said platform having a vertical axis, said mechanism comprising a weight carrier, means for rotating the carrier in a horizontal plane about a vertical axis parallel to said axis, means for vertically displacing the weight carrier parallel to its axis of rotation, said weight carrier having a circular series of apertures concentric with said carrier axis, the radius of said circular series being equal to the distance between said vertical axes, a series of weights arranged in ascending order mounted on said carrier each weight coinciding with one of said apertures, there being one free aperture, said weight carrier being located so that the weight platform is located beneath and axially aligned with one of said apertures, whereby on rotating the weight carrier the selected weight is moved to a position over the weight platform so that on lowering the weight carrier, the selected weight is removed from the carrier and supported by the weight platform.

2. A weight selecting and placing mechanism for fine weighing balances having a spaced pair of superposed weight platforms suspended from the balance beam, said weight platforms being axially aligned about a vertical axis, said mechanism comprising a spaced pair of superposed weight turntables mounted for rotation about a common vertical axis parallel to said weight platform vertical axis, means for rotating each turntable about said common vertical axis independently of each other, means for vertically displacing the turntables, each turntable having a circular series of apertures, the radii of said circular series being each equal to the distance between said vertical axes, a series of weights from 1 to 9 units being mounted on one turntable in ascending order each weight coinciding with one of the apertures of the turntable and leaving one aperture free, a second series of weights from 10 to 90 units being mounted on the other turntable in ascending order each weight coinciding with one of the apertures of said turntable and leaving one aperture free, said turntables being located so that one weight platform is located immediately beneath one turntable and the other weight platform is located immediately beneath the other turntable, said platform being axially aligned with an aperture in each turntable whereby on rotating each turntable the selected weight or the free aperture thereof is moved into vertical alignment with the associated weight platform so that on lowering the turntables the selected weight is removed from the turntable and supported by the associated weight platform.

3. A weight selecting and placing mechanism as claimed in claim 2 wherein the apertures in the turntable are of countersunk shape and the weights have complementary shaped bases, whereby the weights are centered in the apertures.

4. A weight selecting and placing mechanism as claimed in claim 2 wherein the turntables are respectively mounted on co-axial spindle and sleeve elements, pinions on the lower ends of the spindle and sleeve elements, rotatable dial members being geared respectively to said pinions, said dial members having value indications corresponding to the value of the weights on the associated turntable, said spindle and sleeve being relatively rotatable and movable together axially.

5. A weight selecting and placing mechanism as claimed in claim 2, wherein the lower end of the spindle seats on a pivoted lever, cam means operatively connected to said lever whereby the turntables are supported in their upper positions and under control of the cam means move downwardly under the action of gravity.

6. A weight selecting and placing mechanism as claimed in claim 2 wherein each turntable is provided with indexing apertures in its rim corresponding to the weight apertures, and spring biassed arms engaging in said recesses.

7. A weight selecting and placing mechanism as claimed in claim 6, wherein locking means are provided for locking the turntables against rotation when in the lowered position, said locking means comprising a rigid post, projections on the post spaced to conform to the vertical spacing of the turntables, said projections engaging the said rim recesses only when the turntables occupy said lowered position.

8. In combination a fine weighing balance located within an enclosing case, a weight selecting and placing mechanism as claimed in claim 2 located within said case, said balance having a beam, a weight hanger assembly comprising a bar, a yoke supporting said bar and suspended by a bail from said beam, said bar having a vertically spaced pair of horizontal arms, weight platforms on said arms and disposed in axial alignment with the weight aperture on said turntables, a counterpose weight carried by said yoke whereby the hanger assembly hangs vertical.

9. A combination as claimed in claim 8 wherein the beam carries a supplementary weight scale pan associated with said hanger assembly, said supplementary scale pan receiving weights of multiple unit value additional to those weights on the turntables, thus providing an increased total weight value within the capacity of the balance.

10. A combination as claimed in claim 8, including a cam shaft, a cam on said shaft for raising the beam, a second cam on said shaft for controlling the lowering of the turntables, said cams being angularly displaced so that the beam cam comes in operation after the lowering of the turntables by the associated cam.

SYDNEY RAYNER GREEN.

References Cited in the file of this patent

UNITED STATES PATENTS

| Number | Name | Date |
| --- | --- | --- |
| 1,125,874 | Osgood | Jan. 19, 1915 |
| 1,345,180 | Heusser | June 29, 1920 |
| 1,566,994 | Spiro | Dec. 22, 1925 |
| 2,192,905 | Gattoni | Mar. 12, 1940 |

FOREIGN PATENTS

| Number | Country | Date |
| --- | --- | --- |
| 161,178 | Great Britain | Oct. 6, 1921 |